United States Patent [19]

Machida

[11] Patent Number: 5,148,020
[45] Date of Patent: Sep. 15, 1992

[54] OPTICAL ENCODER WITH PHOTODETECTORS OF WIDTH EQUAL TO AND ONE-HALF OF CODE WHEEL'S WINDOW AND SPOKE WIDTH

[75] Inventor: Akihiro Machida, Komae, Japan

[73] Assignee: Hewlett-Packard Company, Palo Alto, Calif.

[21] Appl. No.: 686,677

[22] Filed: Apr. 17, 1991

[51] Int. Cl.$^5$ .............................................. G01D 5/34
[52] U.S. Cl. ........................... 250/231.16; 250/231.17; 250/237 G
[58] Field of Search ........................ 250/231.17, 231.14, 250/231.16, 237 G; 356/375; 33/707

[56] References Cited

U.S. PATENT DOCUMENTS 4,654,525  3/1987  Ebina et al. ................... 250/231.14
4,833,316  5/1989  Yoneda .............................. 250/237 G Primary Examiner—David C. Nelms
Assistant Examiner—Que T. Le

[57] ABSTRACT

The invention provides an optical encoder for encoding the position of a rotatable shaft. The encoder generates an index pulse having the same logic level regardless of the direction of rotation of the shaft. The encoder includes a light source; a code wheel having plural alternating windows and spokes which respectively transmit or block light from the light source; and first, second, and third photodetectors in alignment with the light source. The code wheel is mounted between the light source and the photodetectors. The first photodetector has a unit width and is mounted between the second and third photodetectors which each have a one-half unit width. The index window has a three-unit width. The encoder also includes a buffer circuit having a first input connected to the output of the second and third photodetectors, and a second input connected to the output of the first photodetector.

20 Claims, 7 Drawing Sheets

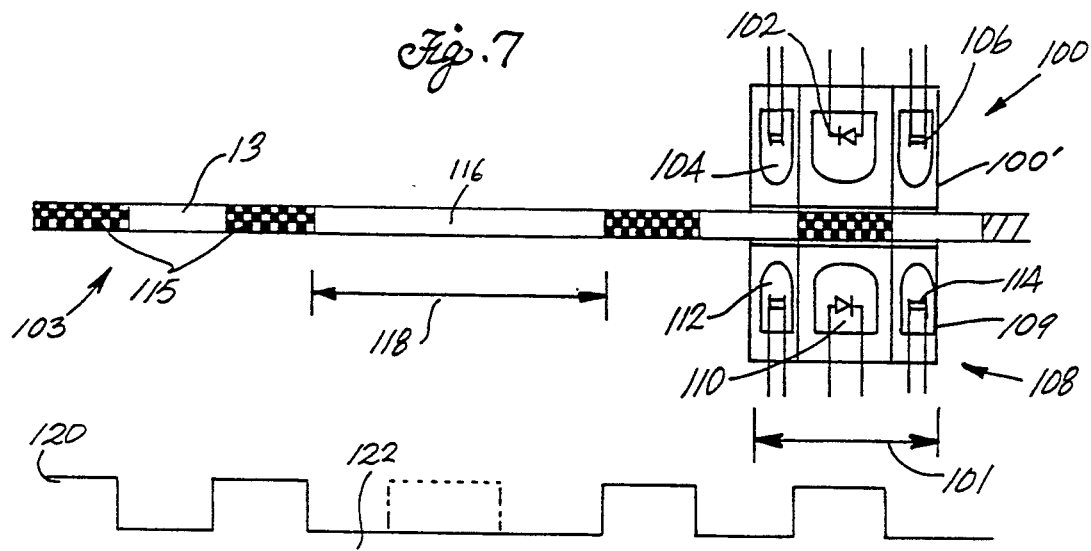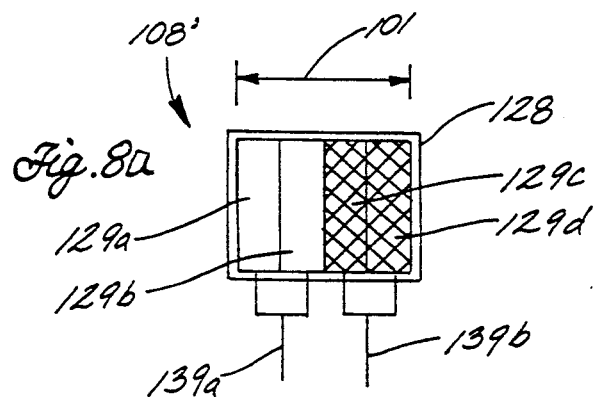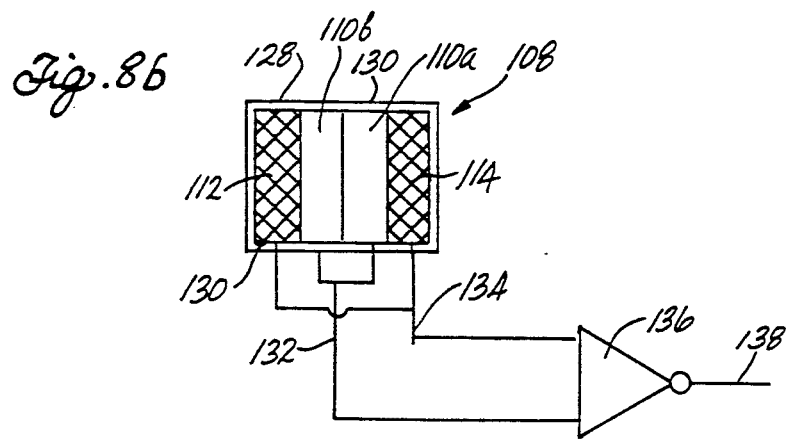

OPTICAL ENCODER WITH PHOTODETECTORS OF WIDTH EQUAL TO AND ONE-HALF OF CODE WHEEL'S WINDOW AND SPOKE WIDTH

FIELD OF THE INVENTION

This invention generally relates to position sensors or encoders, such as optical shaft angle encoders, which produce discrete electrical signals indicative of the angular position of a shaft. In particular, the present invention improves generation of an index pulse or index location at a consistent logical level regardless of the direction of rotation of the shaft.

BACKGROUND OF THE INVENTION

Incremental optical motion encoders are used to resolve the position and movement of an object along a particular route. Such encoders generally include a light source for emitting a light beam, light modulation means for modulating the light beam in response to movement of the object along the route, and detection means for receiving modulated light and for producing discrete electrical signals representing detection of light by the detectors. As the light is modulated in response to the movement of the object, the stream of electrical signals from the detector assembly produces a continuous wave form usually resembling a square wave. The position of the object along its route determines the position of each signal in the wave form. The phase of the wave form differs depending upon the location of the object. Thus, signals from the detectors can be used to indicate a change in location of the object along the route. Two or more out-of-phase signals from separate detectors can be used to detect both change in location and change of direction of movement.

For an incremental motion encoder to indicate the absolute position or location of the object along its route, an index pulse is generated at least once along the route. The incremental signals can be used to count incremental movement from the index pulse. If the position of the object is known at the time the impulse pulse is generated, the absolute position of the object at any place along the route can be determined.

Therefore, to provide an indication of absolute position, change in location and direction of movement, an incremental encoder usually requires three channels of information. Two channels are derived from two or more out-of-phase encoder signals that are produced throughout the route of the object, and the third is an index signal produced at least once along the route at a known position of the object.

In a typical embodiment, such a position encoder or movement detector is used to measure the angular position of a shaft. Depending on the use of such a shaft angle encoder, a high degree of resolution and accuracy may be needed; for example, in automotive crankshaft angle measurement applications or accelerator speed control, a resolution of 2000 increments per revolution of the shaft may be necessary. Accuracy of the correlation between the signal from the encoder and the actual mechanical position of the shaft is also important. Mechanical alignment discrepancies can adversely affect accuracy as can electrical noise, due to the very small dimensions of the code wheel, the transmissive sections and the non-transmissive sections.

To accurately detect the index pulse, a push-pull electronic arrangement may be used to determine the location of the index pulse. In such an arrangement, two photodetectors are arranged laterally adjacent one another in vertical alignment with a light source; a spoked circular code wheel fixed to the shaft separates the light source and the detectors. When one of the detectors is illuminated, a logic signal of one sense, such as 1, is produced. When a spoke on the code wheel occults the illumination, the opposite logic signal is produced, such as a logical 0. When the index window passes over the detectors, one detector will generate a logic 1 of long duration, followed an instant later by a logic 1 from the second detector. The direction of travel of the code wheel may be determined by sensing which detector is first to generate a long-duration logic 1.

Another desirable feature of code wheel encoders is to determine the index location regardless of the direction of rotation of the code wheel or shaft. Since code wheels ordinarily can rotate both clockwise and counter-clockwise, it is desirable that the encoder apparatus produce an index pulse output at a consistent logic level regardless of the direction of rotation. In conventional code wheel encoders employing push-pull optics and electronics using two adjacent light sources and two adjacent detectors, the logical value of the index pulse is different depending on the direction of rotation. Thus, if the wheel is rotating clockwise, such conventional circuits will produce a low logic value index pulse, and when the code wheel is rotating counter-clockwise, the conventional circuit will produce a high-logic value index pulse. This feature is undesirable, because the circuitry receiving the index pulse must accommodate for both high and low logic values. Such accommodation ordinarily requires additional undesirable hardware.

Thus, it is desirable to provide an optical encoder apparatus which produces an index pulse having the same logic value regardless of the direction of rotation of the code wheel. Preferably, this is provided by modifying the photo receptor or photodetector assembly rather than changing external hardware, and using a conventional push-pull encoder.

SUMMARY OF THE INVENTION

These and other features and advantages, which will become apparent from the detailed description of the preferred embodiments below, are achieved by providing an encoder for digitally representing the spatial position of a rotatable shaft. The encoder may comprise, for example, the combination of an illumination means for radiating light, first, second, and third photodetectors for responding to the illumination means, and for producing an output signal, and means for interrupting the light for selectively illuminating the photodetectors. Preferably one photodetector has a unit width, and the other two photodetectors each have a one-half unit width.

In an exemplary embodiment, the light interruption means comprises a movable code member mounted between the illumination source and the photodetectors for alternately transmitting or blocking the illumination source upon movement. The code member also includes means for indexing the code member. The second and third photodetectors are preferably arranged to be occulted by a spoke when the first photodetector is illuminated by the light source. The first photodetector is preferably mounted between the second and third photodetectors. Each photodetector can produce a logic value in response to detection of light or the absence of light.

In an exemplary embodiment, the code member comprises a code wheel with a circumferential track comprising a plurality of alternating windows and spokes for alternately transmitting or blocking the illumination means upon movement of the code wheel. Each window and each spoke has a unit width. The means for indexing the code wheel comprises an index window having a three-unit width on the track. The index window, in effect, is formed by removing a spoke from between two adjacent windows. The encoder preferably includes a circuit for processing the photodetector output signals. The circuit comprises a buffer circuit for processing the output signals, having a first input connected to the output of the second and third photodetectors, and a second input connected to the output of the first photodetector.

Use of the invention eliminates the need to incorporate, in an end-user product, additional circuitry to sense the direction of the code wheel and to invert the logic level of the index pulse depending on the direction of rotation of the code wheel. This results in a simplified product which can be manufactured at lower cost. Applications for this technique include automotive equipment location sensing, photocopiers, and other light industrial equipment.

BRIEF DESCRIPTION OF THE DRAWINGS

The foregoing features of the present invention will be better understood upon consideration of the following detailed description of certain preferred embodiments taken in conjunction with the accompanying drawings in which:

FIG. 5b is a schematic representation of the code wheel of FIG. 5a and the wave form output by the apparatus of FIG. 5a;

FIG. 6b is a schematic diagram of output hardware of the apparatus of FIG. 6a;

FIG. 7 is a side elevation of the apparatus of the present invention and a corresponding output waveform;

FIG. 8a and 8b are plan views of two embodiments of the detector of FIG. 7; and

DETAILED DESCRIPTION OF THE PREFERRED EMBODIMENTS

An optical encoder useful to understand the present invention is described in U.S. Pat. No. 4,691,101 (Leonard), the subject matter of which is hereby incorporated by reference. Other shaft angle encoders are described, for example, in U.S. Pat. Nos. 4,259,570, 4,266,125, 4,451,731 and 4,691,101. FIGS. 1-4 herein relate most particularly to the Leonard patent and the subject matter therein. FIG. 4 is representative of the prior art as disclosed in the Leonard patent.

Figure 1:
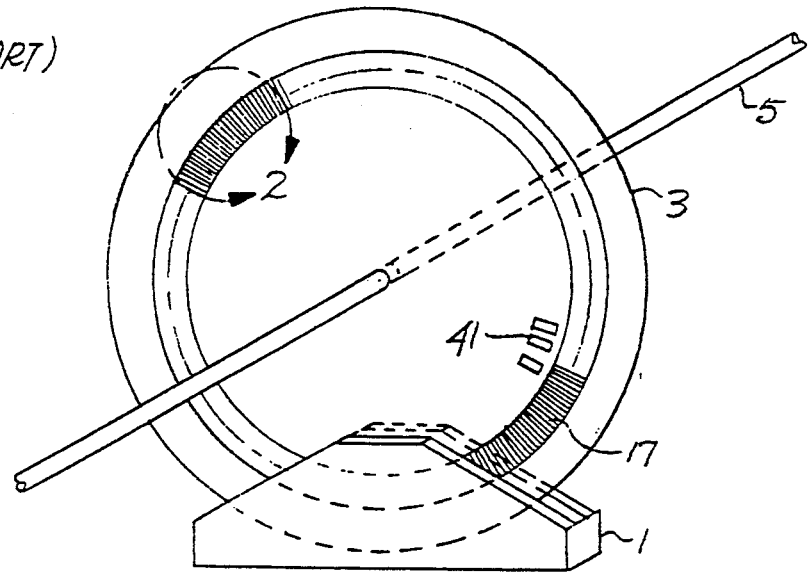
FIG. 1 is a front perspective view of an exemplary code wheel assembly.
Figure 2:
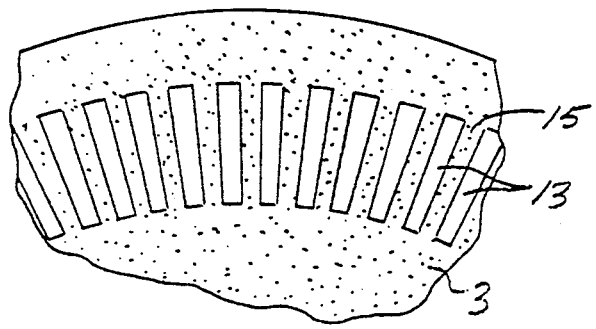
FIG. 2 is a partial view of the face of the code wheel of FIG. 1.
Figure 3:
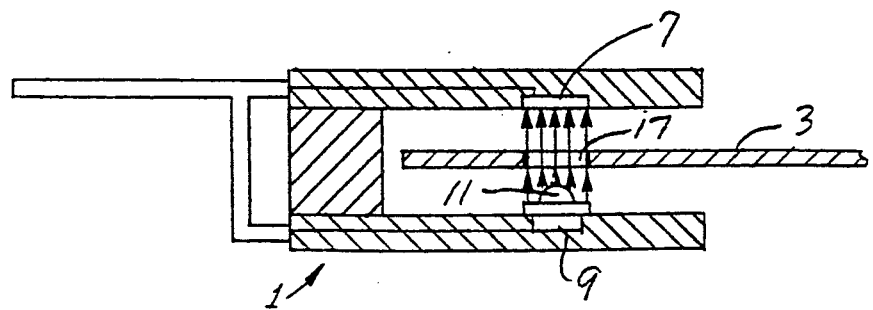
FIG. 3 is a partial section view of the light source and receptor apparatus of FIG. 1.
Figure 4:
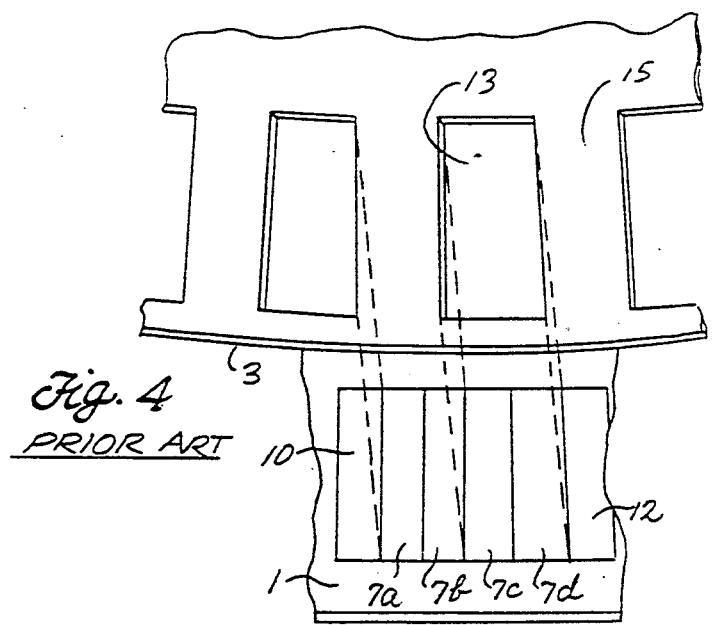
FIG. 4 is an enlarged partial view of the code wheel and receptor apparatus of FIG. 1.

In an embodiment of the invention illustrated in FIGS. 1-3, an encoder module 1 provides a collimated light beam and has light detectors 7 to receive the light beam after modulation by a code wheel 3. A light emitting diode (LED) 9 provides light having a preferred wave length of approximately 700 nanometers; however, any frequency of electromagnetic radiation having a wave length substantially shorter than the relevant dimensions of the encoder may be utilized. For example, infrared light is commonly used. An emitter lens 11 is positioned to transmit the light from the LED 9.

The code wheel 3 of FIG. 2 is concentrically mounted on a shaft 5 to rotate with the shaft and modulate the light beam with an optical track 17. The track 17 has alternating light-transmissive sections or windows 13 and non-light-transmissive sections or spokes 15 of a unit width equal to the width of a window. One transmissive section and one non-transmissive section make up one pitch of the code wheel. As the wheel rotates, the alternating sections 13, 15 block or admit light from the LED, thereby illuminating or blocking light passing to the photodetectors.

In an exemplary embodiment, the code wheel has 500 transmissive sections and an equal number of non-transmissive sections. These sections are trapezoidal in shape since they are located immediately adjacent to one another on a circular track. An exemplary nominal width of each transmissive section is 62 microns, and the radial length of each section is 750 microns. The code wheel is preferably made of a durable, optically opaque material, such as stainless steel, and has a diameter of approximately 22 millimeters. The transmissive sections may comprise holes masked and etched through the disk.

In one embodiment illustrated in Leonard and reproduced herein in FIG. 4, several groups of four light detectors 7a to 7d are provided. A group of four light detectors 7 has approximately the same size and shape of one transmissive section and one non-transmissive section on the code wheel. Individual detectors 7a to 7b have a trapezoidal shape with an exemplary maximum width of 48 microns, a minimum width of approximately 45 microns with a gap of about 8 microns between the individual light detectors. The light detectors preferably comprise photodiodes fabricated on a semiconductor chip using standard bipolar semiconductor technology. As illustrated in FIG. 4, a group of light detectors are placed in a one-dimensional array as close to one another as the bipolar semiconductor technology will allow. Dummy photodiodes 10 and 12 are located on each end of the array to minimize the effect of stray light on the functioning light detectors 7a-7d. In a shaft angle encoder, the photodiodes are arranged in an arc having the same radius as the code track on the code wheel.

Using such an arrangement of four light detectors, four output signals are produced having the same wave form shape but offset from one another by multiples of 90 electrical degrees. These four signals in quadrature are compared for determining the amount and direction of rotation of code wheel.

In an embodiment mentioned in the Leonard patent, there are several groups of four light detectors. The signals from the "A" detectors in the groups are combined; similarly signals from the "B" detectors are summed, etc. By using plural detector groups, a larger detector area is illuminated, providing greater signal strength while maintaining high resolution. Regardless of the number of groups, there are four signals and two channels of information.

Generating an index pulse from a single track code wheel is easily achieved using this known apparatus employing photo interrupters or magnetic sensors, but is difficult using push-pull circuitry. In particular, when a single track code wheel is used with a pair of sensors coupled using push-pull electronics, the index pulse generated has a logic level which differs as the direction of rotation differs.

Figure 5A:
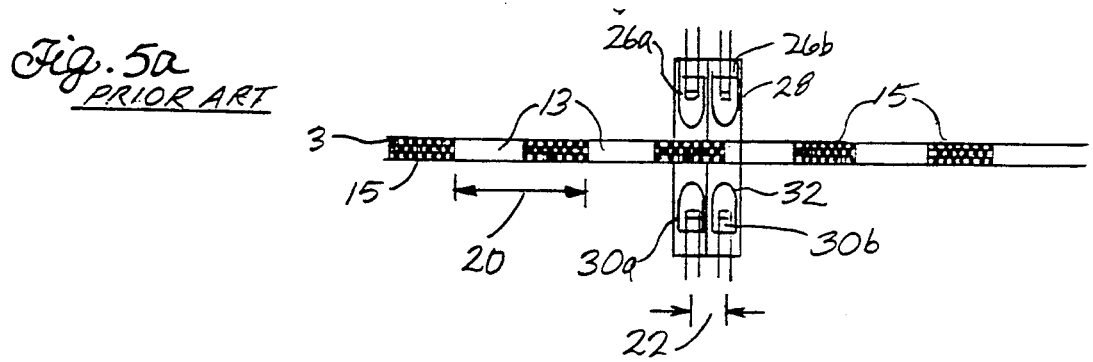
FIG. 5a is a partial schematic cross section of a prior art code wheel and detector assembly.
Figure 5B:
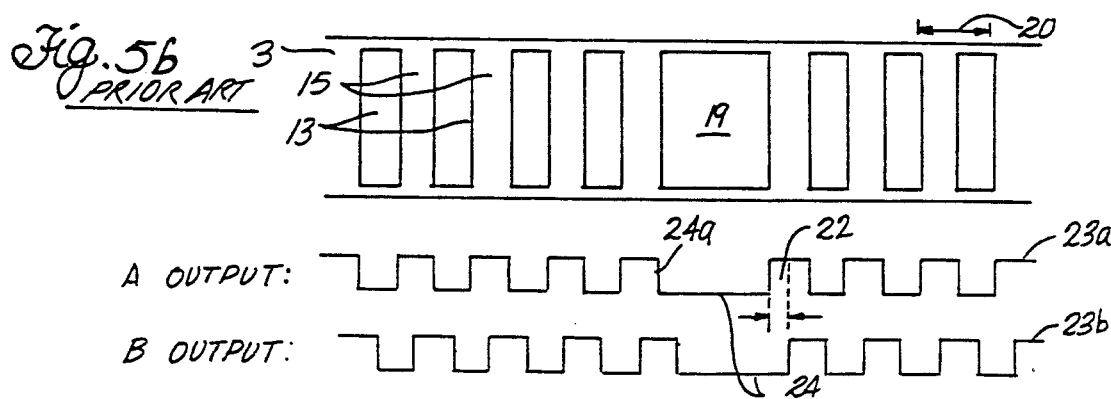

For example, one known technique for detecting the index position of a code wheel having a single track is to use the apparatus of FIG. 5a which produces output waveforms shown in FIG. 5b. FIG. 5b includes a representation of a segment of a code wheel as a flat strip having alternating adjacent windows and spokes each having a unit width. Each pair of one window and one spoke represents one timing cycle of length 20 also called length T. An index window 19 having a width of three units is provided in the wheel. Mounted above the wheel is a light source comprising a pair of LEDs 26a, 26b which may be mounted in a housing 28. Below the wheel is a pair of photodiodes 30a, 30b in a common housing 32. One LED 26a is vertically aligned with one photodiode 30a, and the other LED 26b is vertically aligned with the other photodiode 30b.

However, the first LED 26a and photodiode 30a are offset laterally from the second LED 26b and photodiode 30b by a distance 22 equal to distance T divided by four. The apparatus of FIG. 1b thereby creates a two-channel arrangement in which the first photodiode 30a generates one data channel having a waveform output 23a, and the second photodiode 30b generates a second data channel having waveform output 23b. Waveform 23b is 90 electrical degrees out of phase from waveform 23a due to the lateral separation of the photodiodes 30a, 30b. A low level index pulse 24 is generated when the wheel passes in front of the photodiodes.

As a result, the direction of rotation of the wheel can be determined by sensing which photodiode generates a low pulse 24 first, since in one direction the index window of the wheel will pass photodiode 30a first, while in the other direction photodiode 30b will encounter the index window 19 first.

Figure 6A:
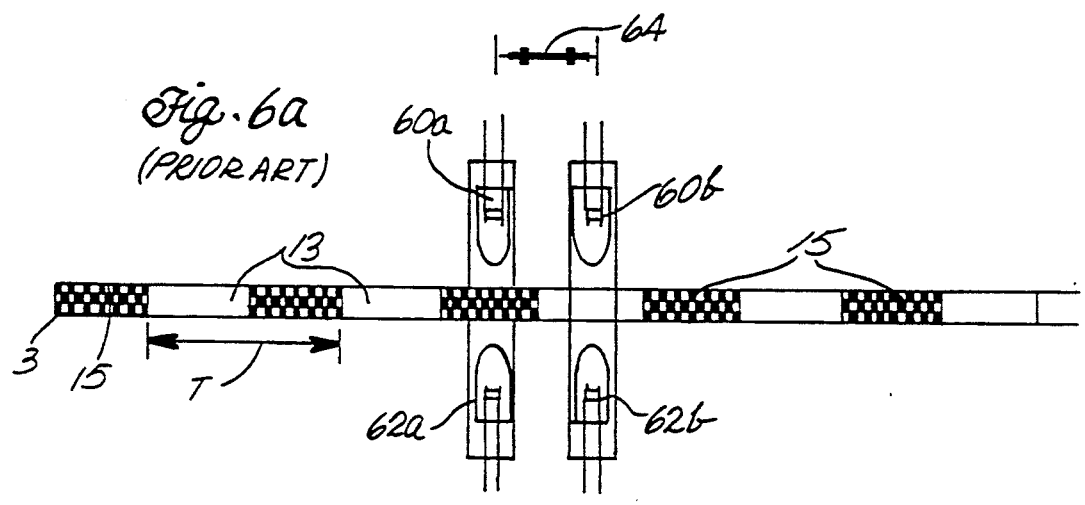
FIG. 6a is a schematic cross section of a second prior art encoder apparatus.
Figure 6B:
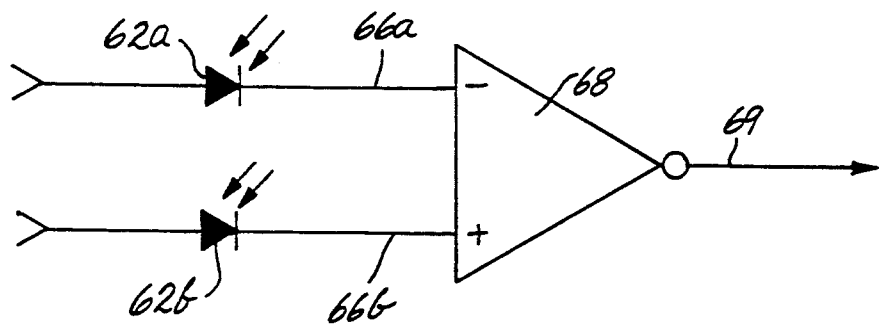

Push-pull circuitry may be added to the apparatus of FIG. 1b, resulting in the apparatus of FIG. 6a, 6b. In this arrangement, the code wheel is unmodified, but the LEDs 60 a, 60b are each aligned over a window or spoke, separated by a distance 64 equal to T divided by two. The photodiodes 62a, 62b are similarly offset by a distance 64, and each produces separate output pulses electrically connected to input lines 66a, 66b of a buffer circuit; these output pulses are of opposite logic level. That is, when a window passes the photodiodes a low signal is generated by photodiode 62a, but a high pulse is generated by photodiode 62b. An operational amplifier 68 combines these signals on a single output line 69.

Figure 6C:
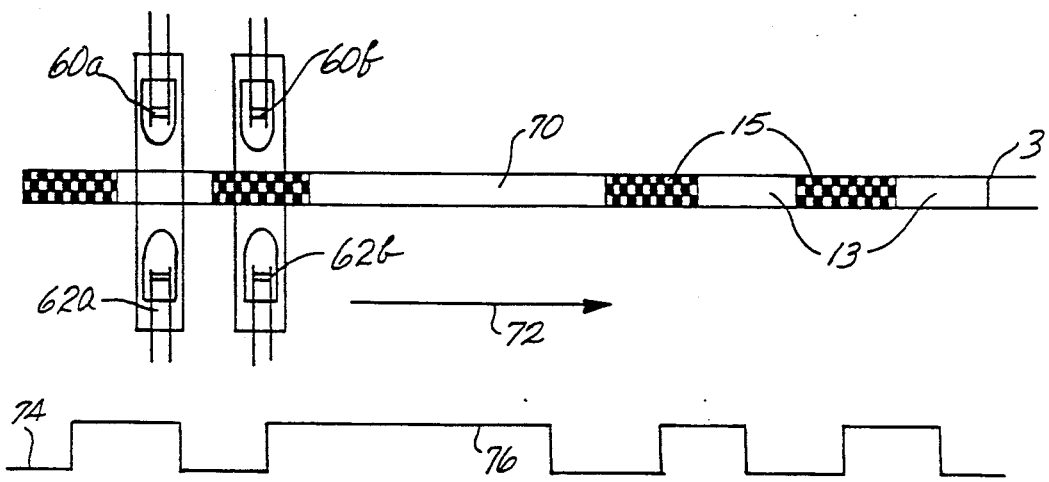
FIG. 6c is a schematic cross section of the apparatus of FIG. 6a in operation in a first direction of rotation.
Figure 6D:
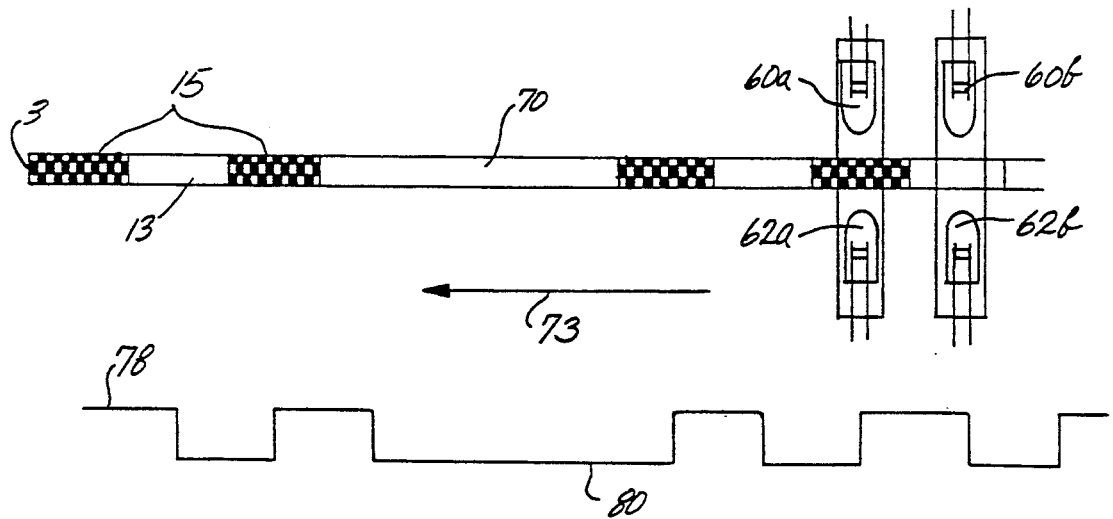
FIG. 6d is a schematic cross section of the apparatus of FIG. 6a operated in a second direction of rotation.

FIGS. 6c and 6d illustrate the direction of movement of the wheel and the corresponding output signals from the apparatus of FIG. 6a, 6b. The wheel includes an index position 70. In FIG. 6c, the wheel is traveling rightward in the direction of arrow 72. Since the index window passes photodiode 62a first, photodiode 62a conducts continuously while the index window is overhead, generating a long high-level index pulse 76. In contrast, in FIG. 6d, the wheel travels leftward in the direction of arrow 73. Therefore photodiode 62b first encounters the window, resulting in generating of a low-level index pulse 80.

This discrepancy in the logic level of the pulses 76 and 80 is a specific problem addressed by this invention. To produce an index pulse having a logic level not affected by the direction of travel of the code wheel, the apparatus of FIG. 7 is used, comprising a code wheel 103, an LED assembly or illumination means 100, and a photodetector assembly or photodetector means 108.

Code wheel 3 includes an index window 116 formed by removing a spoke 115 from wheel 103, resulting in creation of a window 116 having a length 118 of three units.

The LED assembly 100 is preferably mounted in a single housing 100' having a length 101 of two units, that is, less than the length 118. The LED assembly includes a first LED 102, a second LED 104, and a third LED 106, although a single LED having a vertically collimated lens may be used. A collimated lens is required to ensure that light is directed straight at the photodetector assembly 108.

The photodetector assembly 108 similarly is preferably encapsulated in a single housing 109 having a two-unit length 101. The housing may comprise a single integrated circuit. The photodetector assembly includes a first photodetector 110, a second photodetector 112, and a third photodetector 114. The first photodetector 110 has a unit width and is located between the other two photodetectors 112 and 114, which are each fabricated with a width of one-half unit. Thus, the combined width of the three photodetectors and is two units. The length 118 of the index window is 1.5 times the length of the LED and photodetector assemblies.

As indicated in FIG. 8b, the photodetector assembly may be constructed in the form of a single integrated circuit having a flat, generally rectangular body 128 divided into four separate photodetectors 110a, 110b, 112, 114 each having a half-unit width. To enable the four photodetectors to operate as three photodetectors, the center photodetectors 110a and 110b are wired together to produce a single output line 132. Thus, these two center photodetectors 110a, 110b form a unit-width center photodetector panel. Photodetectors 112, 114 are each a half unit wide. The outer pair of photodetectors are also connected together by a single output line 134. The output lines 132, 134 from the photodetectors are connected to a buffer circuit 136 in known manner which produces a single output on line 138.

Alternatively, as shown in FIG. 8a, a conventional two-element push-pull photodetector assembly 108' may be constructed using a first photodetector having photodetector panels 129a, 129b and a second adjacent photodetector comprising detector panels 129c, 129d. Each panel 129a–129d has a half unit width. The total width of the photodetector assembly is two units. Output is provided on a first photodetector output line 139a connected to one pair of photodetectors 129a, 129b and a second output line 139b wired to the other pair of photodetectors 129c, 129d.

Using this apparatus, four different output waveforms 140, 150, 160, 170 are possible depending on the photodetector assembly 108, 108' used and the direction of rotation of the wheel; these waveforms 140, 150, 160, and 170 are shown in FIGS. 9a to 9d.

Figure 9A:
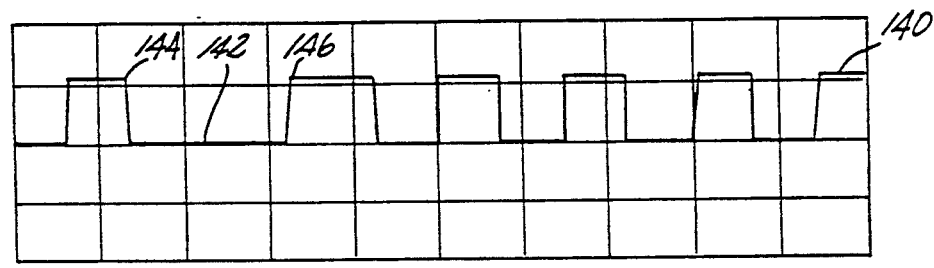
FIG. 9a, 9b, 9c, 9d are schematic representations of the output wave forms of the detectors of FIG. 8a and 8b.

Attention is invited to FIG. 9a which illustrates the waveform output of the side-by-side 108' of FIG. 8a when the wheel is moving in a clockwise direction. This waveform 140 includes a low-level index pulse 142 generated when the index window (116 in FIG. 7) passes the photodetectors. The distance between the trailing edge 144 of the prior pulse and the leading edge 146 of the next pulse is approximately three times the unit pulse width.

Figure 9B:
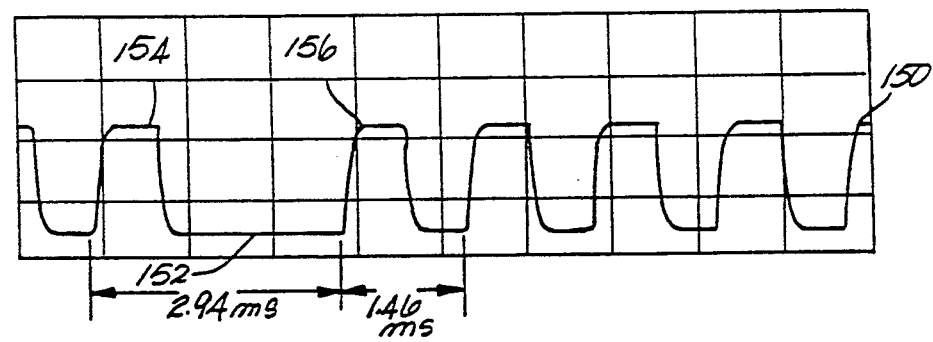

In FIG. 9b the output waveform 150 of clockwise rotation of the wheel past the centered photodetector assembly 108 of FIG. 8b is illustrated. This waveform 150 includes a low level index pulse 152 separated from the trailing edge 154 and the leading edge 156 of adjacent pulses by approximately three times the unit pulse width.

Figure 9C:
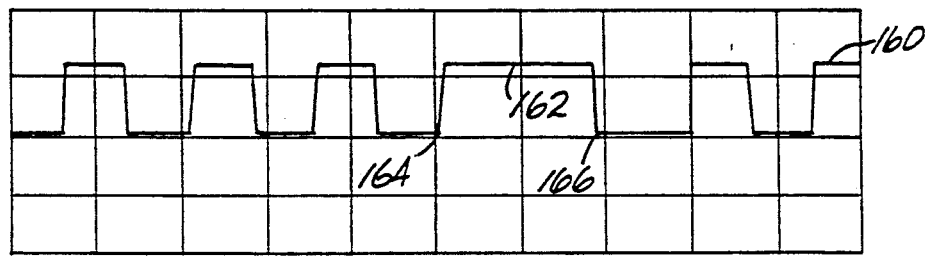

FIG. 9c shows an output waveform 160 resulting from counterclockwise rotation of the wheel when used with the side-by-side assembly. This waveform 160 includes a high-level index pulse 162 having an overall length measured from a start point 164 to an end point 166 of approximately three times the unit pulse width. However, because the direction of rotation has reversed with respect to FIG. 9a, the pulse is high-level rather than low-level as is pulse 142 when the wheel rotates clockwise.

Figure 9D:
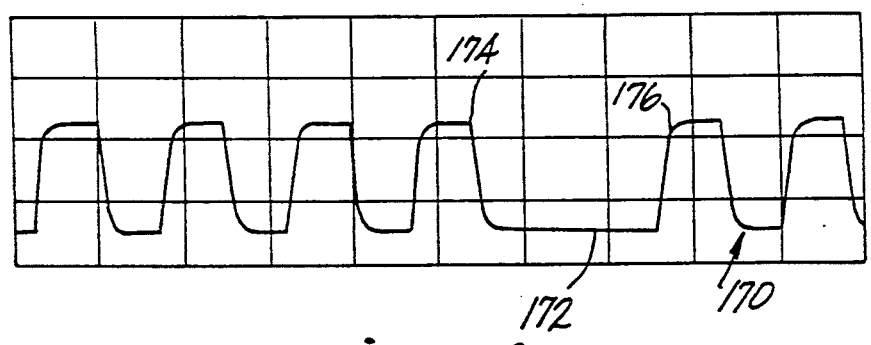

FIG. 9d shows a waveform 170 generated by the detector assembly 108 of FIG. 7b during counterclockwise rotation of the wheel. Although the rotation direction of the wheel is reversed with respect to FIG. 9b, the index pulse 172 remains at a low level, the same as the pulse 152 when the wheel is rotating clockwise. The pulse 172, measured from start point 174 to end point 176, has an overall length approximately three times the unit pulse width.

Thus, output waveforms 150, 170 show that output of the invention apparatus remains consistent regardless of the direction of rotation of the code wheel. Use of the invention eliminates the need to incorporate, in an end-user product, additional circuitry to sense the direction of the code wheel and to invert the logic level of the index pulse depending on the direction of rotation of the code wheel. This results in a simplified product which can be manufactured at lower cost.

As is known in the art, the direction of rotation of the wheel may be determined in several ways. First, in applications in which a single microprocessor controls the direction of a motor turning a shaft on which the lightwheel is mounted, the microprocessor will inherently "know" the direction of rotation. Second, in applications in which the shaft is entirely independent of the photodetectors, such as automotive applications, in combination with the invention an additional push-pull direction detector is used, such as the detector of FIG. 5a or 6a. This additional direction detector may use the same source of illumination as the index detector of the invention. The direction detector may also use a separate, non-indexed data track on the code wheel.

In the foregoing discussion certain specific technical terms are used for the sake of clarity; however, the invention should not be limited to the specific terms so selected. For example, throughout this application, and in the claims, the code wheel is referred to as being located "between" the light source and the photodetectors. However, the term "between" also extends to an arrangement in which both the light source and the photodetectors are located on the same side of the code wheel. In such an arrangement, the code wheel may comprise a solid disk having plural reflective regions, serving as windows, interleaved with opaque, non-reflective "spokes," so that light from the light source reflects off the reflective windows and into the photodetectors. Additionally, the three unit wide window discussed herein is functionally the same as a missing spoke.

What is claimed is:

1. Encoding means for digitally representing a spatial position of a rotatable shaft, comprising:
   illumination means for radiating light;
   light interruption means for selectively transmitting or blocking the light from the illumination means, comprising means defined therein for transmitting a first predetermined width of the light, and for blocking a second predetermined width of the light, wherein the first and second predetermined widths are equal; and
   first, second, and third detection means for responding to the illumination means and the light interruption means, and in response thereto, for producing an output signal indicative of the position of the rotatable shaft, the first detection means having a width equal to the first predetermined width, and the second and third detection means each having a width equal to one-half of the first predetermined width.

2. The encoding means of claim 1, wherein the light interruption means comprises a movable code member and the means for transmitting and for blocking comprises plural windows and spokes for alternately transmitting or blocking light from the illumination means upon movement of the code member, the code member being mounted between the illumination means and the detection means, the code member including means formed therein for providing an index location in the code member.

3. The encoding means of claim 2, wherein the second and third detection means are mounted for being eclipsed by a spoke when the first detection means is illuminated by the illumination means and when the means for indexing the code member is distant from the detection means.

4. The encoding means of claim 3, wherein the first detection means is mounted between the second and third detection means.

5. The encoding means of claim 4, wherein the illumination means comprises first, second, and third light-emitting diodes, the first light-emitting diode having a width equal to the first predetermined width, and the second and third light-emitting diodes having a width equal to one-half of the first predetermined width, and wherein the first light-emitting diode is mounted between the second and third light-emitting diodes.

6. The encoding means of claim 5, wherein the movable code member includes a circumferential track comprising a plurality of alternating windows and spokes for alternately transmitting or blocking light from the illumination means upon movement of the code member, and wherein each window and each spoke has a unit width, and the means for indexing the code member comprises an index window having a three-unit width on the track.

7. The encoding means of claim 6, further including circuit means for receiving and processing the output signal, wherein the circuit means comprises a buffer circuit for processing the output signal, the buffer circuit having a first input connected to the output of the second and third photodetectors, and a second input connected to the output of the first photodetector.

8. The encoding means of claim 7, wherein the illumination means comprises first, second, and third light-emitting diodes, the first light-emitting diode having a width equal to the first predetermined width, and the second and third light-emitting diodes having a width equal to one-half of the first predetermined width.

9. The encoding means of claim 8, wherein the first light emitting diode is mounted between the second and third light-emitting diodes.

10. The encoding means of claim 1, wherein the light interruption means comprises a movable code member including a circumferential track, and the means for transmitting and blocking comprises a plurality of alternating windows and spokes for alternately transmitting or blocking light from the illumination means upon movement of the code member, and wherein each window and each spoke has a width equal to the first predetermined width, and including an index window having a width equal to three times the first predetermined width and being formed in the track.

11. The encoding means of claim 1, wherein the first detection means is mounted between the second and third detection means.

12. A position encoder comprising:
 a radiation source;
 detection means for responding to the radiation source, and in response thereto, for producing output signals, the detection means including a first photodetector having a first predetermined width, and second and third photodetectors each having a second predetermined width;
 a movable code member between the radiation source and the detection means, the code member having an index track thereon comprising a plurality of alternating windows and spokes for alternately transmitting or blocking the radiation source upon movement of the code member, each window and each spoke having a width defined as a unit width, the index track including one index location; and
 circuit means for receiving and processing the output signals,
 wherein the first predetermined width is equal to the unit width, and the second predetermined width is equal to one-half the unit width.

13. The position encoder of claim 12, wherein the second and third photodetectors are mounted for being eclipsed when the first photodetector is illuminated by the radiation source and when the index location is distant from the detection means.

14. The position encoder of claim 13, wherein the first photodetector is mounted between the second and third photodetectors.

15. The encoding means of claim 14, wherein the radiation source comprises first, second, and third light-emitting diodes, the first light-emitting diode having a width equal to the unit width, and the second and third light-emitting diodes having a width equal to one-half of the unit width, and wherein the first light-emitting diode is mounted between the second and third light-emitting diodes.

16. The position encoder of claim 15, wherein the circuit means is a circuit for combining the output signals to produce a final output signal, the circuit including a first input connected to the output of the second and third photodetectors, and a second input connected to the output of the first photodetector.

17. The position encoder of claim 16, wherein the code member has a circular perimeter and wherein the track extends circumferentially around the perimeter.

18. The encoder of claim 17, wherein the index location is a window formed in the code member and having a width of three times the unit width.

19. A position encoder comprising:
 a light source;
 a photodetector having a first predetermined width, and second and third photodetectors each having a second predetermined width, the detectors each producing an output signal in response to light from the light source, the first photodetector being mounted between the second and third photodetectors;
 a movable code wheel between the light source and the photodetectors, the wheel having a circular perimeter and a track extending circumferentially around the perimeter, the track including a plurality of alternating windows and spokes, each window and each spoke having a width defined as a unit width, the track including one three-unit-wide index location; and
 a circuit for combining the output signals including a first input connected to the output of the second and third photodetectors, and a second input connected to the output of the first photodetector, wherein the first and second predetermined widths are equal to the unit width.

20. The encoding means of claim 19, wherein the light source comprises first, second, and third light-emitting diodes, the first light-emitting diode having a width equal to the unit width, and the second and third light-emitting diodes having a width equal to one-half of the unit width, and wherein the first light-emitting diode is mounted between the second and third light-emitting diodes.

* * * * *